United States Patent
Wiggins

[11] 4,216,503
[45] Aug. 5, 1980

[54] SIGNAL RESTORATION AND GAIN CONTROL FOR IMAGE VIEWING DEVICES

[75] Inventor: Douglas G. Wiggins, Penfield, N.Y.
[73] Assignee: Xerox Corporation, Stamford, Conn.
[21] Appl. No.: 23,570
[22] Filed: Mar. 26, 1979
[51] Int. Cl.$^2$ .................... H04N 1/40; H04N 1/04; H04N 3/12
[52] U.S. Cl. .................................. 358/280; 358/294; 358/212
[58] Field of Search ............... 358/212, 213, 168, 171, 358/174, 280, 282, 209, 293, 294; 250/578; 307/221 D

[56] References Cited

U.S. PATENT DOCUMENTS

| | | | |
|---|---|---|---|
| 3,800,078 | 3/1974 | Cochran et al. | 358/213 |
| 3,800,079 | 3/1974 | McNeil et al. | 358/160 |
| 3,962,681 | 6/1976 | Requa et al. | 358/213 |
| 4,065,788 | 12/1977 | Meier et al. | 358/166 |
| 4,074,320 | 2/1978 | Kapes | 358/230 |
| 4,129,853 | 12/1978 | Althauser et al. | 358/282 |

Primary Examiner—John C. Martin

[57] ABSTRACT

A system for restoring image signal levels and setting signal gain for charge coupled imaging devices (CCDs). Following the last image signal or pixel in a line of image data, a predetermined sequence of dark level signals (D) and light level signals (L) are shifted out of the CCD. The dark level signals are the absence of all image information, while the light level signals represent signals introduced at the appropriate time early in the shifting cycle. At the CCD output, the dark and light level signals are isolated and processed by an MPU in accordance with pre-established functions to provide an offset potential and gain multiplicand. The offset potential and gain multiplicand determined are used to remove the offset and set signal gain for the next succeeding line of image signals. The process is repeated as each line of image signals are output from the CCD.

9 Claims, 4 Drawing Figures

SIGNAL RESTORATION AND GAIN CONTROL FOR IMAGE VIEWING DEVICES

This invention relates to an image signal restoration and gain control, and more particularly, to an apparatus and method for restoring absolute image signal output levels and setting signal gain of image viewing devices in response to prevailing operating conditions.

In systems employing image viewing devices such as charge coupled devices or CCDs for viewing as by raster scanning an original, the output signals produced by the CCD include a potential attributable to the inherent operating characteristics of the CCD. To restore the image output signal of the CCD to a true or absolute value, the potential derived from the CCD, referred to as the offset potential or signal must be removed from the image signals. However, if the offset signal removed is greater or less than the actual offset signal, a noticeable aberration or distortion in the image output signal may result. And since the operating characteristics of CCDs often vary widely from one CCD to another and even vary for the same CCD for different integration rates, accurately determining the offset signal to be removed is often difficult. The problem is complicated in systems where multiple CCDs are employed.

Operating systems utilizing the aforementioned image viewing devices are designed for a fixed image signal gain. However, since the operating characteristics of imaging devices such as CCDs may vary, the signal gain may also vary from one CCD to another, and may even vary for the same CCD for different integration rates. Thus one is faced with the prospect, in the case where a system is optimized for a specific CCD operating at a specific speed, of having to redesign or recalibrate the system to accommodate a change in gain due to changes in CCD operating speed or due to replacement of one CCD with another.

This invention relates to an image signal restoration and gain control for an image scanning device having an array of photosensitive elements for viewing an original image and generating image signals in response thereto, the image signals each being comprised of an offset potential and an image potential proportional to the intensity of the image area viewed by the photosensitive elements, and at least one output register for receiving the image signals, the improvement which comprises: means for generating first and second non-image signals in the output register with each of a predetermined number of image signals; means for driving the output register to serially output image signals and first and second non-image signals from the output register; means for separating the first and second non-image signals from the image signals output from the output register; processing means for determining from the first and second non-image signals an offset potential and a signal gain factor required to bring the image signals to a preset signal level; signal restoring means for removing the offset potential from succeeding image signals to restore succeeding image signals to a substantially absolute signal level; and gain correcting means for adjusting the potential level of succeeding image signals in accordance with the gain factor to provide image signals at the preset signal level.

The invention further relates to the method of restoring absolute image signal output levels to the image signals output by an image scanning device and setting signal gain to provide a uniform image signal output level, the scanning device including plural discrete photosensitive elements for generating image signals representative of the intensity of the image viewed by the elements, and at least one output register having a succession of storage gates for temporarily holding the image signals generated, the steps which comprise: clocking the register to serially transfer image signals therein along the register from one storage gate to the next to the register output; as the register storage gates are emptied of image signals, providing predetermined black and light level signals in a preset number of empty register storage gates; continuing clocking of the register after the last image signal has been output from the register to output the dark and light level signals from the register; and restoring absolute image signal output levels to the image signals output from the register and setting signal gain to provide a uniform signal output level in response to the dark and light level signals.

Figure 1:
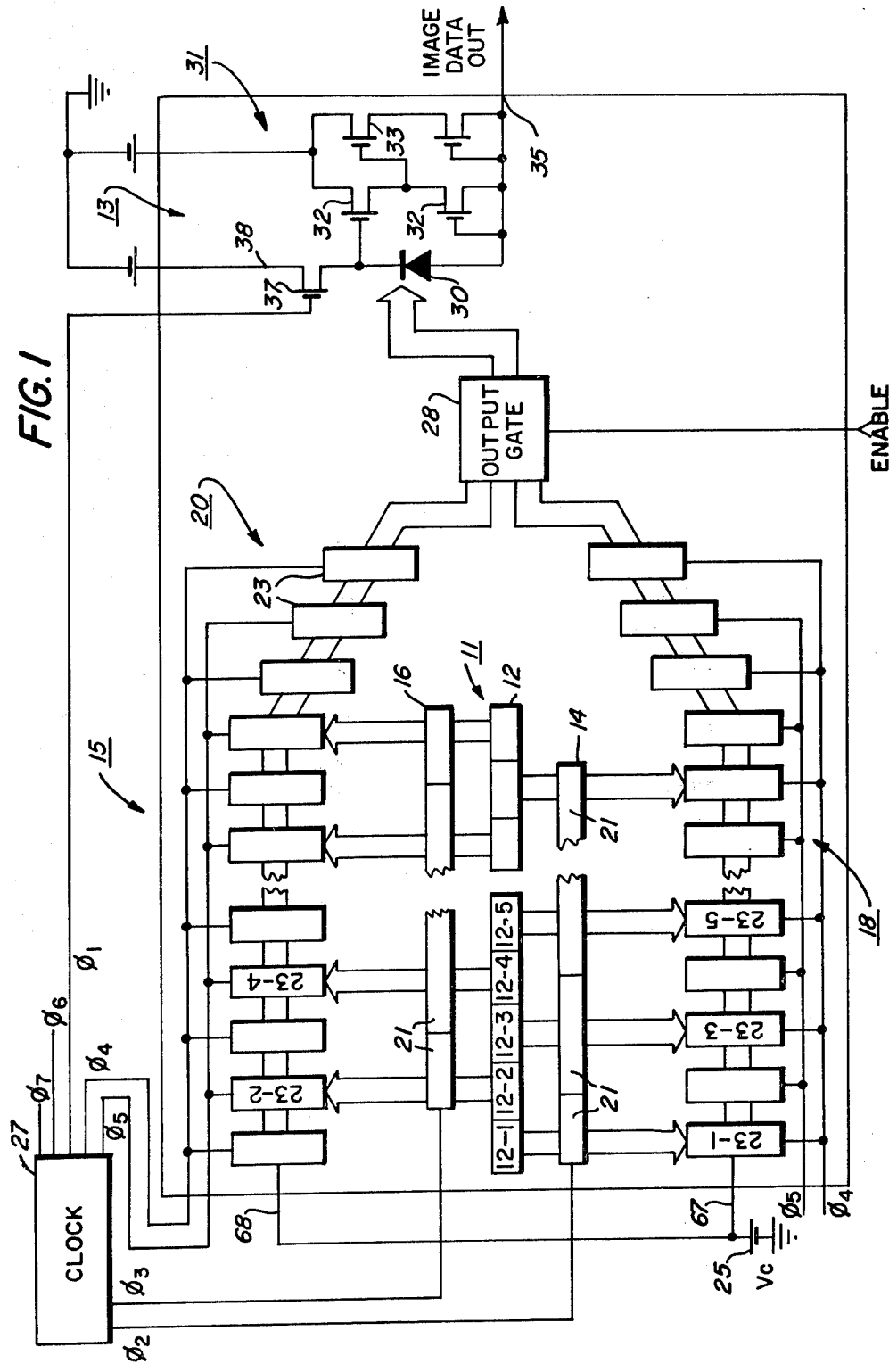
FIG. 1 is a schematic representation of an imaging viewing device of the type used with the present invention.

Referring to the drawings, there is shown the image signal restoration and gain control 10 of the present invention.

As will appear, the control 10 serves to restore the image signal output of an image viewing device, exemplified herein by charge coupled device 15 (commonly referred to as a CCD), to an absolute level. Further, to provide for a uniform image signal output level whatever the image viewing device used, or whatever the integration period, automatic gain adjustment of the image signal output is provided.

While a charge coupled type image viewing device, such as Fairchild Corp. CCD 121-H is described herein, other types of image viewing devices, as for example a Rudicon Inc. Charge Coupled Photo Diode Device CCPD-1728 may instead be contemplated.

CCD 15 includes a succession or array 11 of photosensitive elements 12 on the narrow center portion of silicon chip 13. Array 11 is flanked on either side by rows 14, 16 of transfer gates 21. Shift registers 18, 20 which comprise parallel input/serial output analog registers, are disposed on either side of the rows 14, 16 of transfer gates.

Transfer gates 21 each consist of an electronic switch such as an FET, through which the output of the individual photosensitive elements 12 are coupled to individual phase gates 23 of shift registers 18, 20. The total number of transfer gates in each row 14, 16 is equal to one half the total number of photosensitive elements 12 with alternate, i.e. odd numbered photosensitive elements (12-1, 12-3, . . . ) coupled through row 14 of transfer gates to shift register 18 and even numbered photosensitive elements (12-2, 12-4, . . . ) coupled through row 16 of transfer gates to shift register 20.

Preferably, the total number of phase gates 23 in shift registers 18, 20 is equal to the number of photosensitive elements 12 that comprise array 11. As a result, only alternate shift register phase gates are coupled to photosensitive elements 12. In the exemplary arrangement shown, on activation of transfer gates 21, an image signal is transferred to phase gates 23-1, 23-3, 23-5, ... of shift register 18 and to phase gates 23-2, 23-4, ... of shift register 20.

CCDs 15 serve, in an image system of the type shown in U.S. Pat. No. 4,122,352 for example, to convert the graphical image of an original document to a series of electronic image signals or pixels. Where for example photosensitive elements 12 comprise charge coupled cells as in CCD 15, exposure to the illuminated document generates a charge proportional to the luminous energy reflected from the original document. Exposure is taken over a preset time interval (Ti, Ti' in FIG. 2), termed integration rate. Following integration, the charges in the cells are transferred en masse to phase gates 23 of shift registers 18, 20 by switches 21 of transfer gate rows 14, 16. For this purpose, switches 21 of transfer gate row 14 are enabled by application of clock enabling pulse $\phi_2$ to transfer the charges (i.e., image signals) from the odd numbered cells to shift register 18 following which switches 21 of transfer gate row 16 are enabled by application of clock enabling pulse $\phi_3$ to transfer the charges from the even numbered cells to shift register 20. In the exemplary arrangement shown, the integration times, Ti, Ti' are taken between the leading edges of successive transfer clock pulses $\phi_2$, $\phi_3$ for the odd and even numbered cells respectively.

Figure 2:
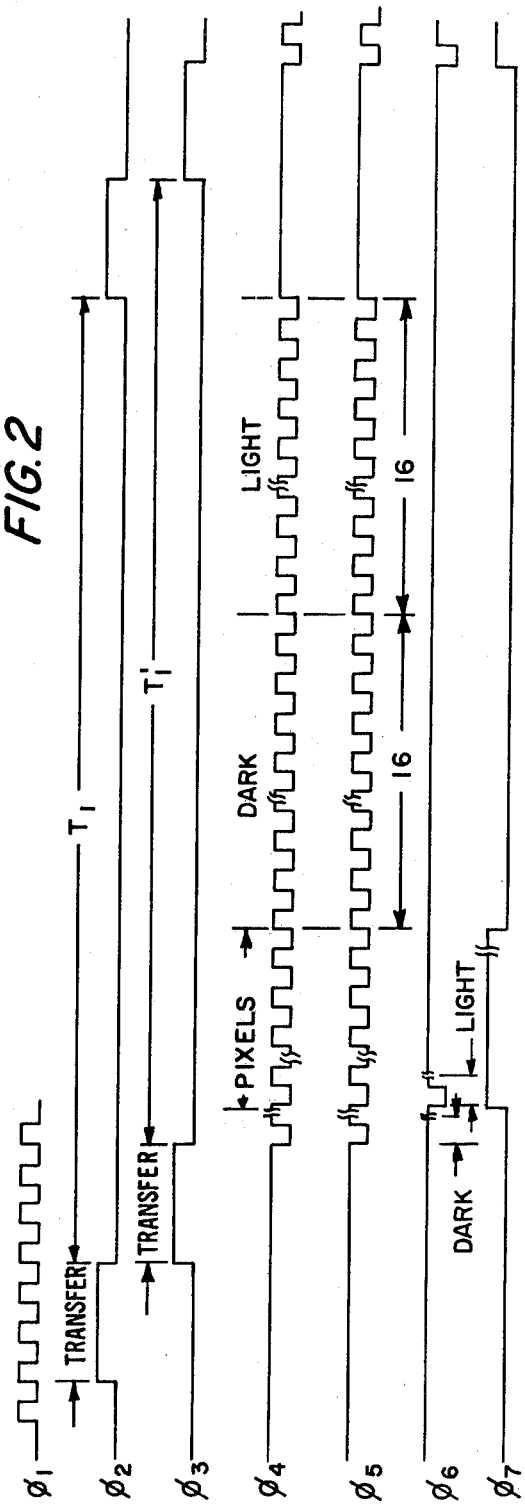
FIG. 2 is a timing chart showing the operating timing sequences of the present invention.

A suitable clock 27, which may for example, comprise a crystal oscillator, provides the various clock timing pulses $\phi_1$–$\phi_7$ seen in FIG. 2.

A uniform initial charge, termed offset potential or offset signal herein is provided in shift registers 18, 20. For this purpose, a bias Vc is input to gates 67, 68 of CCD 15 from a suitable voltage source, exemplified herein by battery 25.

Following transfer of the charges from the charge coupled cells to alternate gates of output registers 18, 20, the resulting image signals are shifted by means of clock driving pulses $\phi_4$, $\phi_5$ serially along registers 18, 20 (i.e., from left to right in FIG. 1) to output gate 28. Inasmuch as alternating phase gates 23 of registers 18, 20 carry only the offset signal derived from bias Vc, only one image signal per clock pulse $\phi_4$, $\phi_5$ is input to gate 28. The image signals and the offset signals from the matching phase gates of the adjoining register are summed in gate 28.

The output signals from gate 28 are clocked into holding diode 30 of CCD output amplifier section 31. Output amplifier section 31 of CCD 10 includes a current amplifying circuit having cascaded FET pairs 32, 33. Each image signal, which is temporarily held on diode 30, appears at CCD output terminal 35, following amplification by amplifier section 31.

The image signal on holding diode 30, following a predetermined time interval determined by the pulse width of clock pulses $\phi_1$, is discarded with activation of discharge FET 37 by a pulse from clock signal $\phi_1$. Activation of FET 37 couples holding diode 30 to a suitable voltage source via line 38 to clear diode 30 for the next image output signal.

Figure 3:
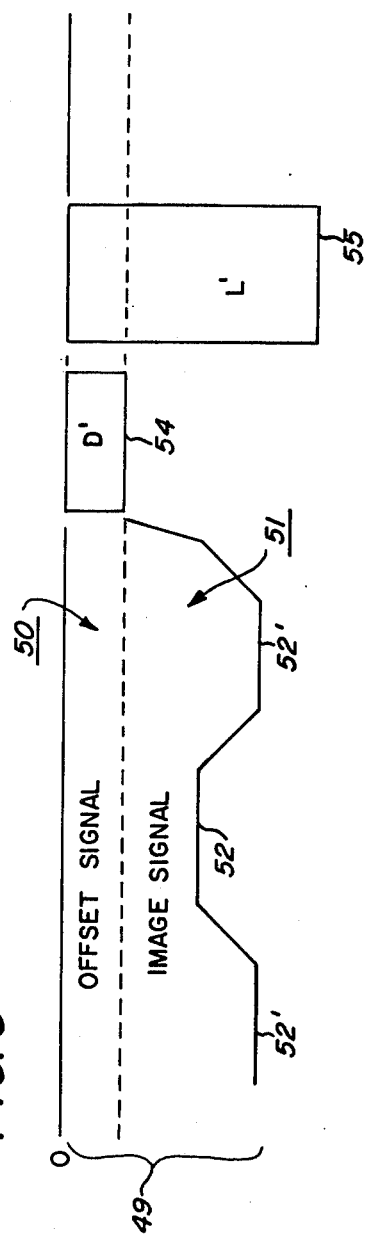
FIG. 3 is a view of a typical image signal output of the viewing device shown in FIG. 1 including the dark and light level signals produced therein in accordance with the present invention.

Referring particularly to FIG. 3, a typical image signal output 49 from CCD 15 is thereshown. Portion 50 of the image signal 49 comprises the offset signal which is derived from the voltage bias Vc. Offset signal 50 has its origin in the non-image bearing phase gates of shift registers 18, 20, while introduction of the charges on cells 12 to the remaining phase gates of registers 18, 20 provides the signal 51 proportional to the intensity of the image viewed. At output gate 28, offset signal 50 and image signal 51 are combined to provide the image signal 49. Areas 52, 52' exemplify a dark image area and a light image area respectively. Signals of this type may result for example, in the case where the original document comprises a series of dark lines with light colored spaces therebetween. Also shown in FIG. 3 are dark (D) and light (L) signals 54, 55 respectively. As will appear, signals 54, 55 result from generation of predetermined test or calibration signals in CCD 15.

As described, the image signals output by CCD 15 include an offset component. To restore the image signals to a true or absolute image signal level, i.e., one without an offset component, the offset component must be removed.

It is desirable in system design and operation, that the system gain be constant whatever the CCD used or the integration rate selected. Signal gain however, can vary from CCD to CCD, and with different integration rates. To assure that system gain remains constant despite differences between CCDs and differences in integration rates, the image signals are modified by the application of a compensating gain factor derived from the instantaneous operating characteristics of the CCD in use.

To determine optimum offset and gain levels for CCD 15, preset dark signals (D) and light signals (L) are generated in CCD 15 at each integration. Exemplary dark signals (D') and light signals (L') are shown in FIG. 3 at 54, 55 respectively. As will appear, the dark and light signals (D, L) generated in CCD 15 are isolated at the CCD output and the drak signals (D) are used to determine the offset component of the image signals while both dark and light signals (D, L) are used to determine the gain factor required to bring the image signals to a predetermined level as will appear.

Figure 4:
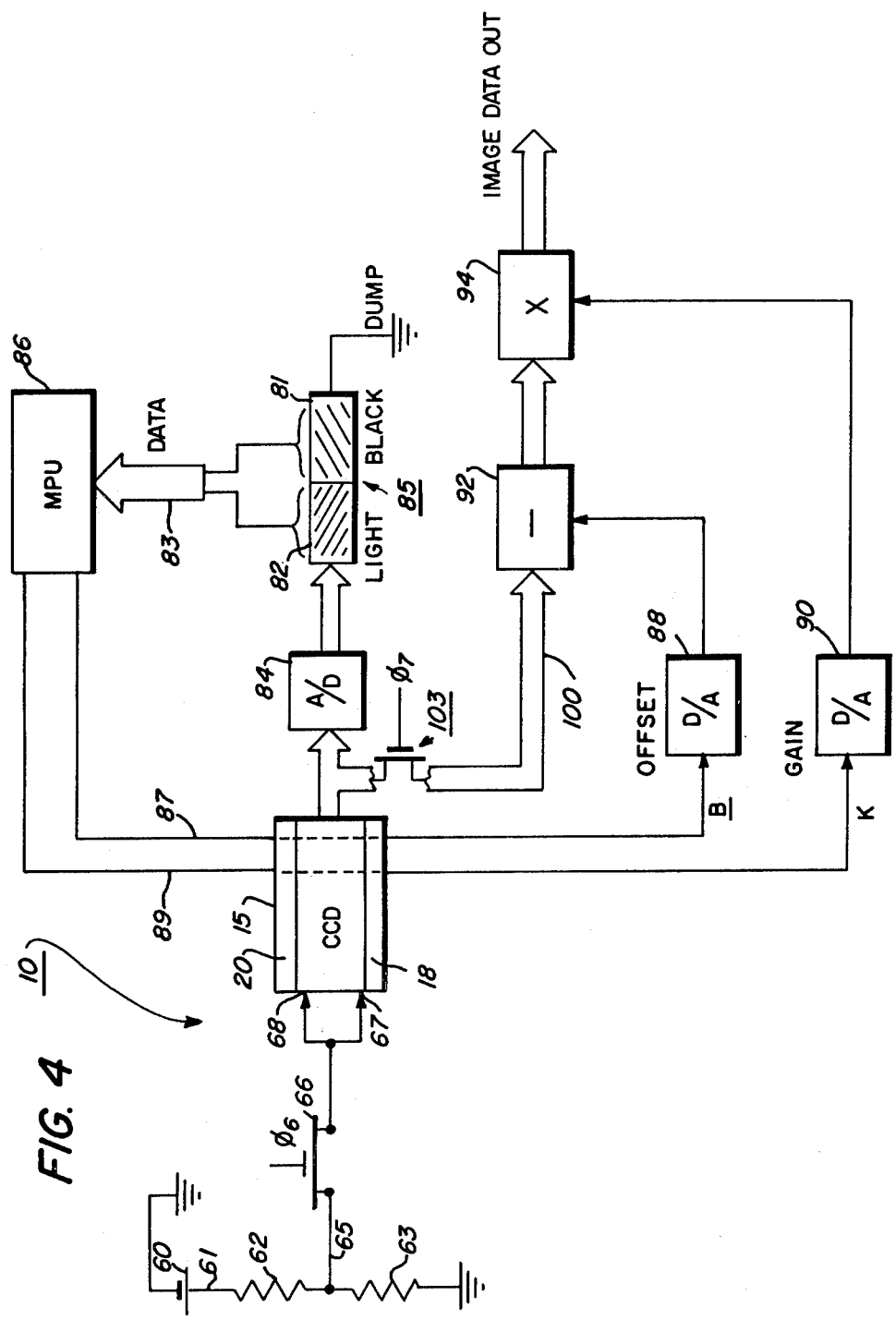
FIG. 4 is a circuit schematic showing details of the signal restoration and gain control of the present invention.

Referring to FIG. 4, light signal (L) is derived from a suitable potential source, exemplified herein by battery 60. Output lead 61 of battery 60 is tapped by light signal input lead 65 between resistor pair 62, 63. As will be understood, battery 60 and resistor pair 62, 63 are chosen to provide the desired voltage level or potential for the light signal (L).

Input lead 65 is coupled through a suitable switch such as FET 66 to auxiliary signal input gates 67, 68 of registers 18, 20. As will appear, FET 66 is actuated periodically for a predetermined number of clock pulses, (i.e. 16) to input a series of light signals (L) to CCD registers 18, 20.

Dark signal (D) is conveniently obtained by clocking registers 18, 20 a predetermined number of times (i.e. 16) beyond the last image signal. Inasmuch as no intervening exposure takes place, the signal produced in registers 18, 20 has a potential representative of the internal potential of CCD 15, i.e. the CCD offset signal.

Since both dark signals (D) and light signals (L) are provided at the upstream end of registers 18, 20, the dark and light signals output from CCD 15 provide a relatively accurate representation of CCD processing conditions.

Referring particularly to FIGS. 1, 2 and 4, as the image signals are clocked serially along shift registers 18, 20 toward output gate 28, the endmost gates 23-1, 23-2, 23-3, etc. are progressively emptied of image data. As a result, only the offset signal, which is derived from bias Vc and which forms the basis for deriving the dark signals (D), exists in the empty phase gates. A preset number of clock pulses $\phi_4$, $\phi_5$ (i.e. 16) are used to generate a block 81 of dark signals (D) in registers 18, 20. Following the preset number of dark signal generating clock pulses, clock pulses $\phi_6$ successively actuate FET 66 to input a series of light signals (L) the level of which is established by battery/resistor combination 60, 62, 63, to shift registers 18, 20. This creates a block 82 of light signals (L) in shift registers 18, 20 behind the block 81 of dark signals (D). In the exemplary arrangement shown, blocks 81, 82 of dark and light signals (D, L) are each 16 pulses wide.

The stream of signals output by CCD 15, which are understood to be made up of a relatively large block of image signals (i.e. 1,728 pixels) followed by the relatively small (i.e. 16 pixels each) blocks 81, 82 of dark and light signals (D, L) are input to Analog-to-Digital (hereinafter A/D) converter 84 where the analog signals are converted to digital signals. One suitable A/D converter is a TRW Model TDC 10145 converter. Digital image signals from converter 84 are input to serial in/parallel out buffer 85. One suitable buffer is buffer Model No. 74S195 by TRW, Inc. Inasmuch as only the blocks 81, 82 of dark (D) and light (L) signals are required to determine the existing offset signal and the requisite gain factor, buffer 85 need only be wide enough to handle the dark (D) and light (L) signals. In the example given, where dark (D) and light (L) signals are each 16 pixels long, buffer 85 may comprise a 32 bit buffer. It will be understood that the image signals, which precede the dark (D) and light (L) signals pass through buffer 85 and are discarded.

Block 81 of dark signals (D) and block 82 of light signals (L) in buffer 85 are input to microprocessor MPU 86 through data bus 83. Microprocessor 86, which may comprise an Intel Model 8080 MPU by Intel Corp., averages the block of dark signals (D) in accordance with the following function:

$$V(OFF) = (V_{D1} + V_{D2} + V_{D3} \ldots V_{DN})/N$$

where,

V(OFF) is the instantaneous average voltage offset signal (i.e. 50 in FIG. 3), $V_{D1}, V_{D2}, \ldots V_{DN}$ are the voltage levels of the individual dark signals that comprise block 81, and N is the total number of dark signals in block 81. In the example discussed, N=16.

The offset signal V(OFF) determined is output by MPU 86 via lead 87 to Digital-to-Analog (D/A herein) converter 88.

In a similar manner, MPU 86 averages the block of light signals (L) in accordance with the following function:

$$V_L(AVG) = (V_{L1} + V_{L2} + \ldots V_{LN})/N$$

where

VL (AVG) is the instantaneous average light signal, $V_{L1}, V_{L2} \ldots V_{LN}$ are the voltage levels of the individual light signals that comprise block 82, and N is the number of light signals in block 82. In the example discussed, N=16.

Using offset signal V (OFF) and light signal VL (AVG), MPU 86 determines the instantaneous gain multiplicand K in accordance with the following relationship:

$$K = V_T / [V_L(AVG) - V(OFF)]$$

where

VT represents the ideal voltage level output.

Gain multiplicand K is output by MPU 86 via lead 89 to D/A converter 90.

D/A converters 88, 90 may comprise Model DAC-08 converters made by Signets, Inc.

D/A converters 88, 90, as will be understood by those skilled in the art, provide the analog equivalent of the offset signal V (OFF) and gain multiplicand K. The output of D/A converters 88, 90 are input to subtractor 92 and multiplier 94 respectively. One suitable subtractor is National Semi-Conductor Model 0032 Differential Amplifier while a suitable multiplier is Motorola Model 1595 Multiplier.

Each succeeding line of signals output by CCD 15 is input via A/D converter 84 to buffer 85 where the dark (D) and light (L) level signals are processed by MPU 86 in the manner described heretofore. As fresh signals enter buffer 85, the previous blocks 81, 82 of dark (D) and light (L) level signals are discarded.

Image signals in the output of CCD 15 are also placed on data output bus 100 which carries the image signals to subtractor 92 for processing. In subtractor 92 the offset signal V (OFF), as determined for the preceding line of image signals by MPU 86, is subtracted from the image signals thereby restoring the image signals to an absolute or substantially absolute signal level.

Image signals from subtractor 92 are input to multiplier 94 where the image signals are multiplied by the multiplicand factor K as determined by MPU 86 for the preceding line of image signals. This sets the image signal output level to assure a level commensurate with the ideal output level Vt in accommodation of the particular CCD being used and the existing integration time. The image signals are output by multiplier 94 for further processing and/or use.

FET control gate 103 serves to limit the signal input to data bus 100 to image signals and exclude other signals, particularly dark and light signals (D, L). Clock pulse $\phi_7$ actuates gate 103 in unison with the image signal output of CCD 15 to transfer image signals into bus 100. However, actuation of gate 103 is terminated following the last image signal to preclude passage of dark and light signals (D, L) into output bus 100.

FETs 66, 103 may comprise Signetics Model No. SD5001 FETs.

While in the exemplary arrangement shown, blocks 81, 82 of dark (D) and light (L) signals are generated with each line of image signals, other relationships, as for example, generating dark and light signals at the start of each page with calibration of CCD 15 once per page, may be envisioned. It will be further understood that dark signals (D) may be derived from a source other than CCD bias source 25, that the potential levels of both the dark and light signals may comprise any suitable potential, and that the order in which dark and light signals are generated may be reversed.

While multiplier 94 is disclosed herein as being downstream of subtractor 92, the positions may be reversed. In that circumstance, suitable compensation must be made for the change in processing locations of the image signals as will be understood.

While the invention has been described with reference to the structure disclosed, it is not confined to the details set forth, but is intended to cover such modifications or changes as may come within the scope of the following claims:

What is claimed is:

1. An image signal restoration and gain control for an image scanning device having an array of photosensitive elements for viewing an original image and generating image signals in response thereto, said image signals each being comprised of an offset potential and an image potential proportional to the intensity of the image portion viewed by said elements, and at least one output register for receiving said image signals, the improvement comprising:
   (a) means for generating first and second nonimage signals in said register with each of a predetermined number of image signals;
   (b) means for driving said rigister to serially output image signals and said first and second non-image signals from said register;
   (c) means for separating said first and second non-image signals from image signals output from said register;
   (d) processing means for determining from said first and second non-image signals an offset potential and a signal gain factor required to bring the image signals to a preset signal level;
   (e) signal restoring means for removing said offset potential from succeeding image signals output by said scanning device to restore succeeding image signals to a substantially absolute level; and
   (f) gain correcting means for adjusting the potential level of said succeeding image signals in accordance with said gain factor to provide image signals at a preset signal level.

2. The control according to claim 1 including
   (a) analog-to-digital converter means for converting said first and second signals output by said scanning device to digital signals for input to said processing means; and
   (b) digital-to-analog converter means for converting the signal output of said processing means representing said potential and said signal gain factor to analog signals for use by said signal restoring means and said gain correcting means.

3. The control according to claim 1 including:
   (a) buffer means for storing said first and second signals for use by said processing means in determining the potential derived from said scanning device and said signal gain factor;
   (b) means for routing the signal output of said scanning device to said buffer means, and to said signal restoring means and said gain correcting means; and
   (c) means for removing said first and second signals from the image signals routed to said signal restoring means and said gain correcting means whereby only image signals are input to said signal restoring means and said gain correcting means.

4. The control according to claim 1 in which said signal restoring means comprises subtractor means for subtracting said offset potential from said succeeding image signals.

5. The control according to claim 4 in which said gain connecting means comprises multiplier means for multiplying said succeeding image signals, said multiplier means being downstream of said subtractor means.

6. The method of restoring absolute image signal output levels to the image signals output by an image scanning device and setting signal gain to provide a uniform image signal output level, the scanning device having plural discrete photosensitive elements for generating image signals representative of the intensity of the image viewed by said elements, and at least one output register having a succession of storage gates temporarily holding image signals generated, the steps comprising:
   (a) clocking said register to serially transfer image signals therein along said register from one storage gate to the next to said register output;
   (b) as said register storage gates are emptied of image signals, providing predetermined black and light level signals in a preset number of empty register storage gates,
   (c) continuing clocking of said register after the last image signal has been output from said register to output said dark and light level signals from said register; and
   (d) restoring the absolute image signal levels to the image signals output from said register and setting signal gain to provide a uniform signal output level in response to said dark and light level signals.

7. The method of restoring absolute image signal output levels to the image signals output by an image scanning device and setting signal gain for an image viewing device with an array of image viewing elements, and at least one parallel in/serial out register coupled to said viewing elements in parallel for receiving image signals generated by said viewing elements and serially transferring said image signals along said register to an output of said register, the steps of:
   (a) providing preset dark and light level signal to said shift register with a preset block of image signals from said viewing elements;
   (b) clocking said shift register to transfer said block of image signals together with said preset dark and light level signals serially along said shift register to the shift register output;
   (c) segregating said preset dark and light level signals from said block of image signals on output of said signals from said shift register;
   (d) determining from said preset dark and light level output signals, the restoration potential required to restore image signals generated by said viewing elements to an absolute level and the gain factor required to produce an image signal output at a predetermined potential level;
   (e) removing said restoration potential from the succeeding block of image signals generated by said viewing elements to thereby restore said succeeding block of image signals to said absolute level;
   (f) multiplying image signals in said succeeding block of image signals by said gain factor to provide an image signal output at said predetermined potential level; and
   (g) repeating steps a–f for each line of image signals.

8. The method according to claim 7 including the steps of:
   (a) converting said preset dark and light image signals to binary level signals for use in determining said restoration potential and said gain factor; and
   (b) converting the signals representing said restoration potential and said gain factor to analog signals for processing said succeeding block of image signals output by said viewing elements.

9. The method according to claim 7 including the steps of:

(a) separating the signal output of said register into a first signal stream comprising said preset dark and light level signals, and a second signal stream comprising said block of image signals only;
(b) buffering said first signal stream for use in determining said restoration potential and said gain factor; and
(c) processing said second signal stream with said restoration potential and said gain factor.

* * * * *